(12) United States Patent
Nachtmann et al.

(10) Patent No.: US 9,032,838 B2
(45) Date of Patent: May 19, 2015

(54) CLUTCH ARRANGEMENT

(71) Applicant: Schaeffler Technologies AG & Co. KG, Herzogenaurach (DE)

(72) Inventors: Florian Nachtmann, Strassburg (FR); Christoph Raber, Ottweiler-Steinbach (DE); Olaf Schillinger, Ettlingen (DE); Marcus Scherrer, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/049,276

(22) Filed: Oct. 9, 2013

(65) Prior Publication Data

US 2014/0033861 A1 Feb. 6, 2014

Related U.S. Application Data

(63) Continuation of application No. PCT/DE2012/000313, filed on Mar. 26, 2012.

(30) Foreign Application Priority Data

Apr. 11, 2011 (DE) .......................... 10 2011 016 711

(51) Int. Cl.
| F16F 15/14 | (2006.01) |
| F16F 15/31 | (2006.01) |
| F16D 13/71 | (2006.01) |
| F16B 37/12 | (2006.01) |

(52) U.S. Cl.
CPC ............... *F16F 15/31* (2013.01); *F16B 37/125* (2013.01); *F16D 13/71* (2013.01); *F16F 15/145* (2013.01)

(58) Field of Classification Search
USPC ............ 74/572.2, 574.2; 192/30 V, 89.1, 112
See application file for complete search history.

(56) References Cited

U.S. PATENT DOCUMENTS

| 6,129,192 | A  | * | 10/2000 | Jackel et al. ................ 192/70.17 |
| 6,280,330 | B1 | * | 8/2001  | Eckel et al. ........................ 464/3 |
| 6,325,192 | B1 | * | 12/2001 | Reik et al. ................ 192/70.252 |
| 7,195,111 | B2 | * | 3/2007  | Fukushima ................ 192/70.17 |

FOREIGN PATENT DOCUMENTS

| DE | 102006028552 | 5/2007 |
| DE | 102007024115 | 12/2007 |
| DE | 102008005138 | 8/2008 |
| DE | 102009042831 | 4/2010 |

* cited by examiner

*Primary Examiner* — Vicky Johnson
(74) *Attorney, Agent, or Firm* — Volpe and Koenig, P.C.

(57) ABSTRACT

A clutch arrangement, in particular for use in the drive train of a motor vehicle, including a flywheel which is arranged on the drive side and is coupled via a spring arrangement to a secondary disk and is part, with said secondary disk, of a two-mass flywheel. The secondary disk has at least one centrifugal force pendulum, and a threaded sleeve is screwed with an outer thread into an inner thread of the secondary disk, and a clutch housing is screwed to an inner thread of the threaded sleeve via a fastener.

10 Claims, 8 Drawing Sheets

CLUTCH ARRANGEMENT

INCORPORATION BY REFERENCE

The following documents are incorporated herein by reference as if fully set forth: International Application No. PCT/DE2012/000313, filed Mar. 26, 2012; and German Patent Application No. 102011016711.0, filed Apr. 11, 2011.

BACKGROUND

The invention relates to a clutch arrangement, in particular for use in the drive train of a motor vehicle, comprising a flywheel which is arranged on the drive side, is coupled via a spring arrangement to a secondary disk and, with the latter, is part of a two-mass flywheel, the secondary disk carrying at least one centrifugal force pendulum.

A centrifugal force pendulum (CFP) serves, just like a two-mass flywheel (TMF), to reduce oscillations and noise in the drive train of a motor vehicle. The centrifugal force pendulum comprises at least one pendulum mass which is suspended, for example, by carrier rollers on a rotating carrier disk and can perform a relative movement to the carrier disk along predefined pendulum tracks, said pendulum mass assuming a variable spacing from the rotational axis of the carrier disk. The construction and the function of a centrifugal force pendulum device of this type is also described, for example, in DE 10 2006 028 552 A1. In addition, centrifugal force pendulum devices are known from DE 10 2007 024 115 A1 and DE 10 2008 005 138 A1. The application of a centrifugal force pendulum in combination with a two-mass flywheel can take place in different ways. The arrangement of the centrifugal force pendulum on the secondary flange of the two-mass flywheel or between the back-pressure plate and the primary flange on a dedicated flange which is connected to the secondary flange is known.

A vehicle clutch having a centrifugal force pendulum which is integrated into the back-pressure plate is known from DE 10 2009 042 831 A1. The centrifugal force pendulum is arranged radially outside the clutch plate and the pressure or back-pressure plate. As a result of the large radius of its movement path, the moment action of the pendular masses is great, but only three pendulums can be arranged over the circumference, since the installation space also has to be utilized for plate springs for attaching the pressure plate to the clutch housing.

Known implementations of centrifugal force pendulums which are integrated into the back-pressure plate can be mounted in the drive train of a vehicle only in a complicated manner, since mounting directly from the transport position of the pre-assembled clutch is not possible. The clutch has to be dismantled partially for mounting purposes, a multiplicity of manual work operations being necessary.

SUMMARY

It is an object of the invention to simplify the assembly of the clutch arrangement, in particular to reduce the number of dismantling steps before assembly of the clutch arrangement which is supplied in the transport position.

This object is achieved by way of a clutch arrangement, in particular for use in the drive train of a motor vehicle, comprising a flywheel which is arranged on the drive side, that is coupled via a spring arrangement to a secondary disk and, with the latter, is part of a two-mass flywheel, the secondary disk carrying at least one centrifugal force pendulum, a threaded sleeve being screwed with an external thread into an internal thread of the secondary disk, and a clutch housing being screwed with a screw to an internal thread of the threaded sleeve. The clutch housing, also called clutch cover, is fastened to the secondary side of the two-mass flywheel, that is to say the secondary disk which also serves as back-pressure plate, only by way of the screws which are screwed into the threaded sleeves. The two-mass flywheel including centrifugal force pendulum therefore forms one structural unit which is connected to the second module which comprises the pressure plate, plate spring etc., only by way of said screws. A special tool is therefore not required to install the clutch module.

In one embodiment of the invention, pre-assembled as a module, the centrifugal force pendulum is attached to the secondary disk. The mounting of the centrifugal force pendulum takes place independently of the mounting of the components which are connected to the clutch housing.

In one embodiment of the invention, the at least one centrifugal force pendulum comprises a secondary-side guide plate and a housing-side guide plate, between which a pendulum mass is arranged, the guide plates being arranged on both sides of a region of the threaded sleeve with an enlarged diameter. The region with the enlarged diameter is a type of bead in cross section which has a support face at both axial ends in each case for one of the two guide plates. The pendulum moves in a sliding manner relative to the back-pressure plate and clutch housing on the guide plates.

In one embodiment of the invention, the threaded sleeve has a hollow-cylindrical flange which protrudes into a hole of the clutch housing. The flange serves to center the clutch housing with respect to the threaded sleeve. The threaded sleeve therefore comprises all means for radial and axial fixing (centering) and for fastening; no further bolts or the like are required.

In one embodiment of the invention, at least one shear clamping stud is mounted in the holes of the secondary disk and of the clutch housing and protrudes through holes of the secondary-side guide plate and of the housing-side guide plate. The shear clamping stud fixes the position of the guide plate in the radial direction and in the circumferential direction.

In one embodiment of the invention, at least one stop means limits the pendulum movement of the pendulum mass. In each case one stop is preferably arranged on both sides of each pendulum mass and limits the pendulum deflection thereof.

In one embodiment of the invention, the at least one stop is mounted in the holes of the secondary-side guide plate and of the housing-side guide plate. Here, the stop is riveted to both guide plates or is riveted only to one of the guide plates, in particular to the housing-side guide plate. In the last-mentioned embodiment, mounting is particularly easy, since first of all the secondary-side guide plate can be mounted, the stop is then plugged in, the pendulum masses are mounted and then the cover-side guide plate is plugged onto the stop and is riveted. As soon as the clutch cover is screwed on, the centrifugal force pendulums are also fixed in the axial direction.

In one embodiment of the invention, the at least one stop is a flat rivet with a stop-damping sheath. The flat rivet is an elongate rod with a rectangular cross section, the two ends of which have a round cross section and protrude with said ends into the guide plates. The secondary disk and the clutch housing have holes, depressions or the like for receiving parts of the ends, which can also be rivet heads, which protrude out of the guide plates. The sheath is a rubber covering, a plastic sheath, a sheath which is pushed on, or the like.

In one embodiment of the invention, a primary cover of the drive-side flywheel has a hollow-cylindrical region which covers at least parts of the centrifugal force pendulum in the axial direction and thus forms a rupture protection arrangement. If parts of the centrifugal force pendulum and/or the clutch fail, fragments are caught by the rupture protection arrangement and prevent damage to surrounding components.

BRIEF DESCRIPTION OF THE DRAWINGS

In the following text, one exemplary embodiment of the invention will be explained using the appended drawings, in which.

DETAILED DESCRIPTION OF THE PREFERRED EMBODIMENTS

Figure 1:
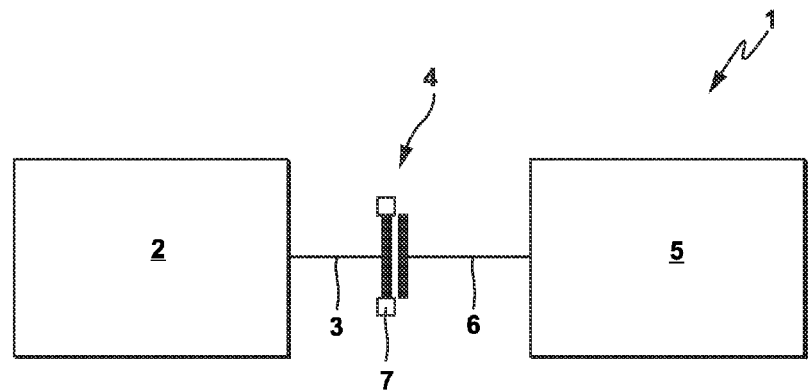
FIG. 1 shows a drive train which is shown in a simplified diagrammatic form.

FIG. 1 shows a drive train 1 which is shown in a simplified diagrammatic form with an internal combustion engine 2, and a crankshaft 3, on which a clutch arrangement 4 is received in a rotationally fixed manner. A two-mass flywheel can be arranged between the crankshaft 3 and the clutch arrangement 4. Depending on the embodiment of the transmission 5, the clutch arrangement 4 can be configured as a single friction clutch or as a double clutch with two friction clutches. Accordingly, the transmission of the torque which is output by the internal combustion engine 2 takes place via the clutch arrangement 4 to two or, as shown, to one transmission input shaft 6. In the transmission 5, a rotational speed conversion and an output (not shown) of the torque via a differential to the drive wheels take place. In order to reduce or eliminate torsional oscillations of the drive train 1, the clutch arrangement 4 has a centrifugal force pendulum 7 which is adapted to the oscillation behavior of the internal combustion engine 2 on its own or in coordination with further devices which are arranged in the drive train in order to reduce torsional oscillations, for example a two-mass flywheel and/or a clutch-plate damper.

Figure 2:
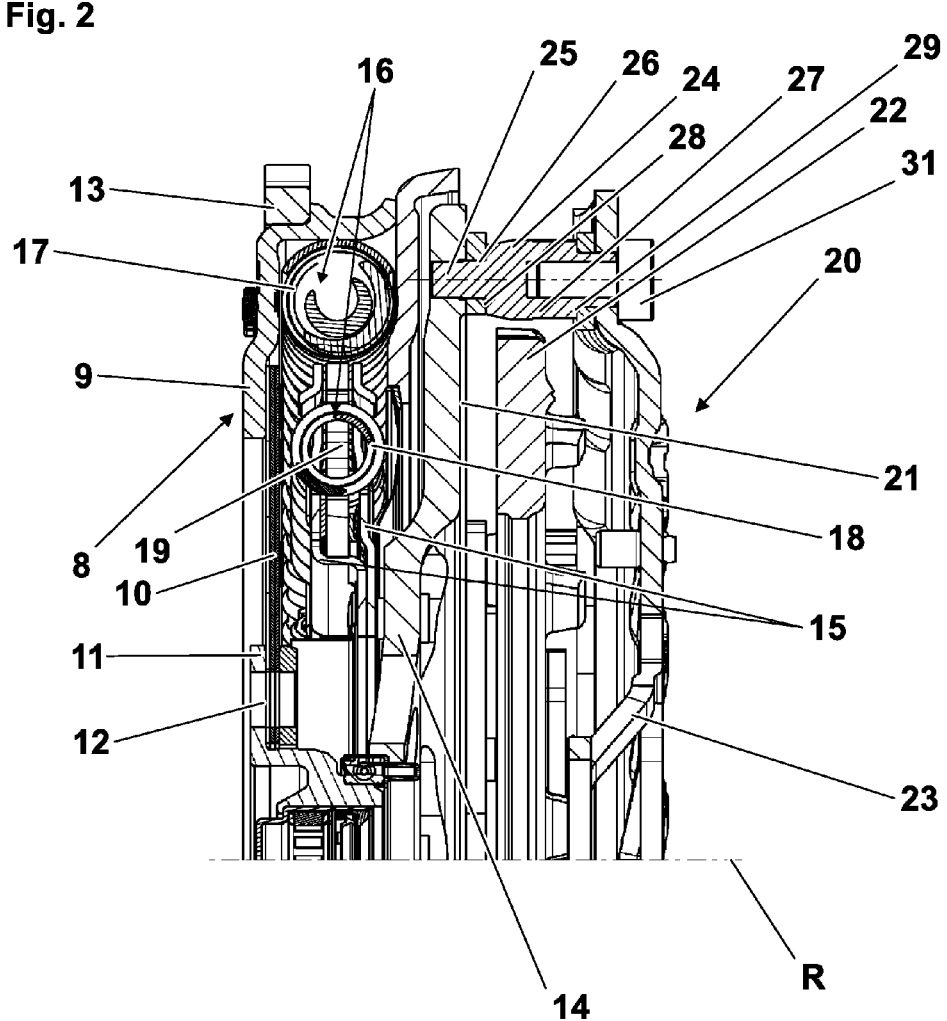
FIG. 2 shows parts of one exemplary embodiment of a clutch arrangement according to the invention, in cross section.

FIG. 2 shows parts of a clutch arrangement 4 according to the invention, in cross section. A flywheel 8 comprising a primary mass 9 which is connected fixedly by way of a connecting plate 10 to a crankshaft flange 11 is connected fixedly by way of fastening hole 12 to a crankshaft (not shown in FIG. 2) of an internal combustion engine. The primary mass 9 carries a starter crown gear 13 which is in engagement with a pinion of an electric starter or can be brought into engagement with said pinion. A secondary disk 14 which is at the same time the back-pressure plate of the friction clutch which is shown later is connected by way of a secondary flange 15 to a spring arrangement 16 which is arranged between the primary mass 9 and the secondary disk 14. The spring arrangement 16 comprises main damper spring 17 and auxiliary damper springs 18 which are connected in series with one another via a connecting flange 19. A construction of this type of a two-mass flywheel is known per se from the prior art.

The secondary disk 14 is part of the secondary mass and is at the same time the back-pressure plate of a friction clutch 20. To this end, the secondary disk 14 has a friction face 21 which is provided with a friction pad (not shown in FIG. 2) and interacts with a clutch plate (not shown in FIG. 2) which is coupled to a transmission input shaft of a speed-changing transmission. Through the use of a pressure plate 22 which can be displaced in the axial direction, the clutch plate can be clamped with a frictional connection between the friction face 21 of the secondary disk 14 and the pressure plate 22. To this end, the pressure plate 22 is connected fixedly to the secondary disk 14 so as to rotate with it with regard to the rotation about the rotational axis R. The axial direction is the movement along the rotational axis R. The actuation of the pressure plate 22 takes place by way of a plate spring (not shown in FIG. 2) which is supported on a clutch housing 23 in a manner which is known per se.

The connection of the clutch housing 23 to the secondary disk 14 takes place by way of threaded sleeves 24. The threaded sleeves 24 are arranged distributed over the circumference of the clutch. The threaded sleeves 24 in each case have a threaded pin 25 with an external thread which is screwed in each case into a hole with an internal thread in the secondary disk 14. The threaded pin 25 is adjoined by a bolt region 26, the diameter of the bolt region being slightly greater than the external diameter of the threaded pin 25. The bolt region 26 serves to fasten guide plates (shown further below) of the centrifugal force pendulum. As viewed in the axial direction, the bolt region 26 is adjoined by a region 27 with an enlarged diameter, which region 27 in each case forms a support plate 28 or 29 as a support face for the guide plates on both sides. On the side which faces the clutch housing 23, the threaded sleeve 24 has a hollow-cylindrical flange 30 which protrudes through a hole of the clutch housing 23. The hollow-cylindrical flange 30 has an internal thread which is introduced into the threaded sleeve 24 by way of a corresponding hole as far as into the region with an enlarged diameter 27. A screw 31, by way of which the clutch housing 23 is screwed fixedly to the secondary disk 14, is screwed into the internal thread of the threaded pin 25.

Figure 3:
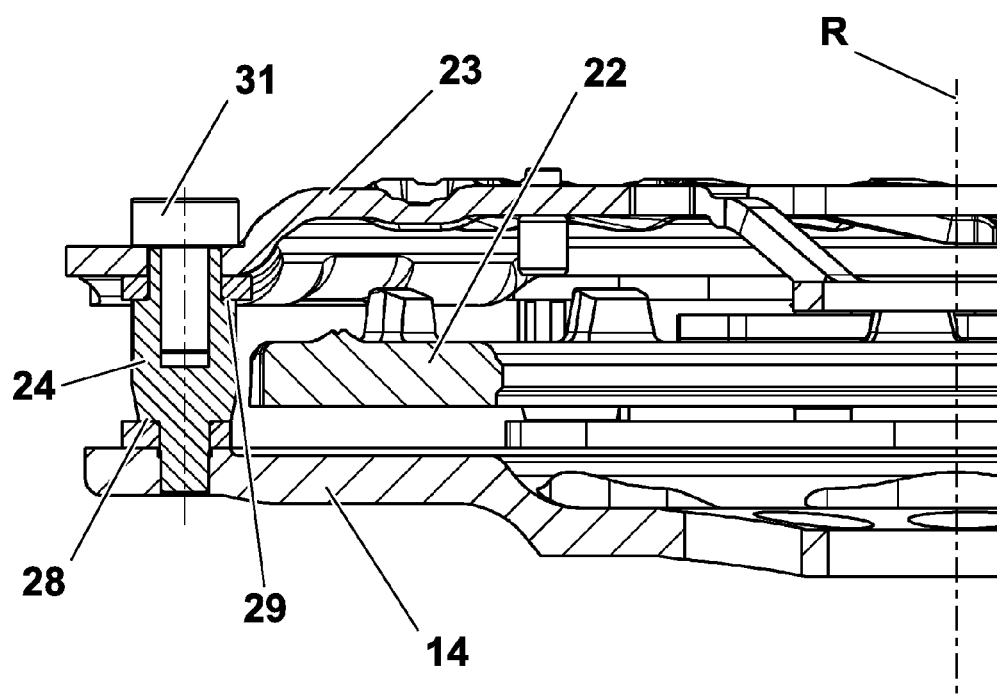
FIG. 3 shows parts of the friction clutch according to FIG. 2 in an enlarged illustration.

FIG. 3 shows one of the friction clutches according to FIG. 2 in an enlarged illustration. The secondary disk 14 is shown, to which the clutch housing 23 is fastened by means of the threaded sleeves 24.

Figure 4:
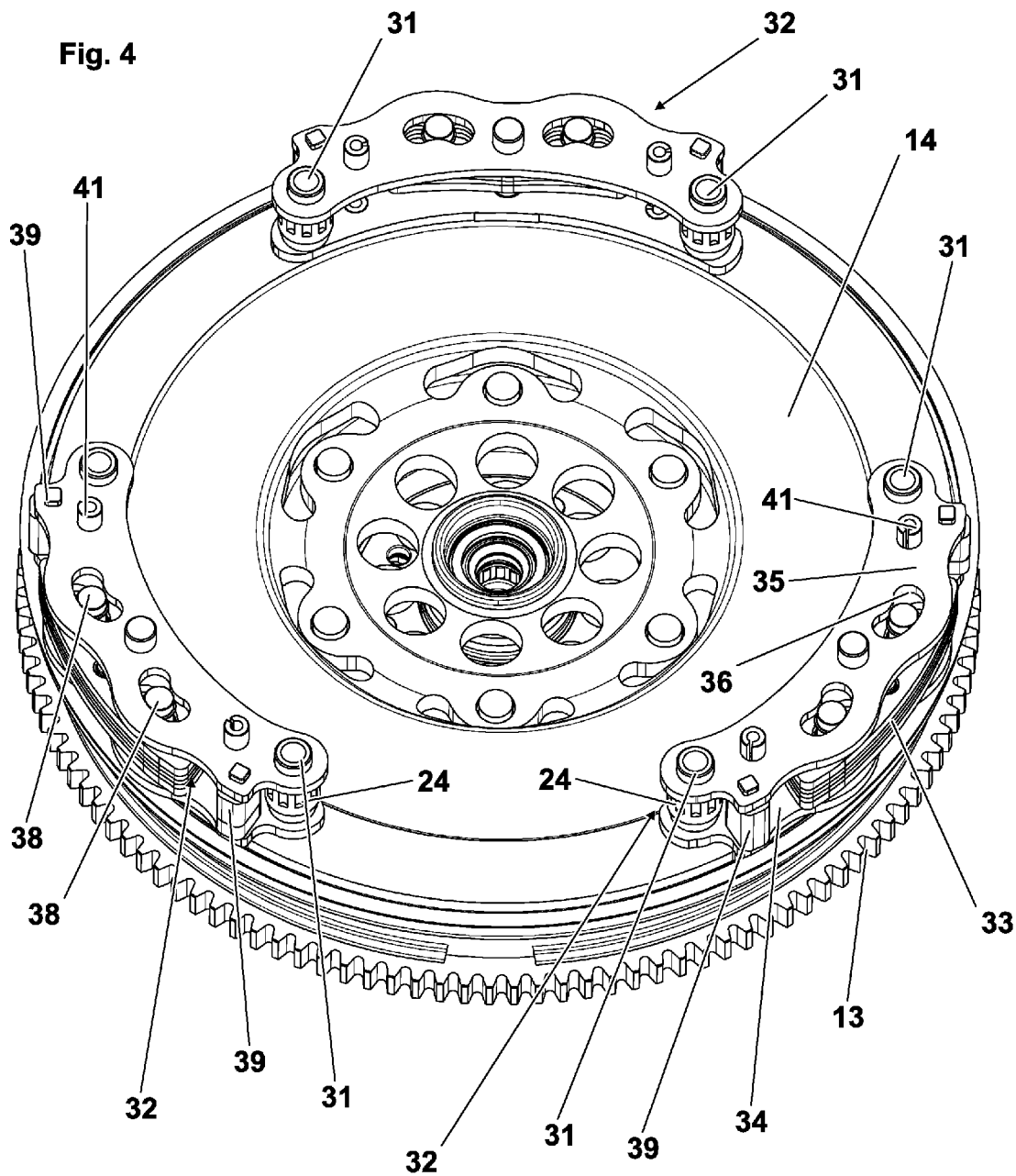
FIG. 4 shows the two-mass flywheel including secondary disk and the centrifugal force pendulum which is attached thereto, as a module in a three-dimensional illustration.

FIG. 4 shows the two-mass flywheel including secondary disk 14 and the centrifugal force pendulum 32 which is attached thereto. The starter crown gear 13 can be seen on the two-mass flywheel, and the components which are shown further using FIG. 2 are covered by the secondary disk 14. In the present exemplary embodiment, three centrifugal force pendulums 32 are arranged distributed over the circumference of the friction clutch; here, however, other numbers of centrifugal force pendulums, for example two, four, five centrifugal force pendulums, etc., can also be provided.

Each centrifugal force pendulum comprises a pendulum mass 33 which can include, for example, of a stack of a plurality of identical or similar plates, which is arranged between a guide plate 34 on the secondary-disk side and a housing-side guide plate 35. The guide plates 34, 35 are provided in each case with slotted guide recesses 36, and the pendulum masses 33 are correspondingly provided with slotted guide recesses 37. Guide pins 38 are arranged in the slotted guide recesses 36 of the guide plates 34, 35 and the slotted guide recess 37 of the pendulum masses 33. The pendulum masses 33 can perform a relative rotation about a moment pole which differs from the rotational axis R, said pendulum masses 33 rolling on the guide pins 38 which in turn roll on the slotted guide recesses 37 of the guide plates 34, 35. Centrifugal force pendulums of this type are known, for example, from DE 10 2006 028 552 A1.

Flat rivets 39 which are arranged in the circumferential direction on both sides of the pendulum masses 33 and are provided in each case with rubber sleeves as rubber stops form end stops for the pendulum masses 33. As can be seen from FIG. 4, the secondary-side guide plates 34 are screwed fixedly to the secondary disk 14 by means of the threaded sleeves 25. The housing-side guide plates 35 are pushed over the hollow-cylindrical flange 30 of the threaded sleeves 24, see also FIGS. 2 and 3 in this regard, and are pressed onto the support plates 29 by the clutch housing 23 only after mounting of said clutch housing 23. In the pre-assembled module which is shown in FIG. 4, the housing-side guide plates 35 are connected fixedly to the secondary-side guide plates 34 only by way of the flat rivets 39. In this way, the centrifugal force pendulums 32 are already connected to the secondary disk 14, however, as pre-assembled modules. Centering bolts 40 connect the housing-side guide plates 35 and the secondary-side guide plates 34 to the secondary disk 14, by said centering bolts 40 protruding into corresponding holes of the secondary disk 14. A plurality of shear clamping studs 41, of which only the shear clamping studs 41 which are introduced into the housing-side guide plates 35 can be seen in FIG. 4, connect the secondary-side guide plates 34 to the secondary disk 14 and the housing-side guide plates 35 to the clutch housing 23 in the finally assembled clutch.

Figure 5:
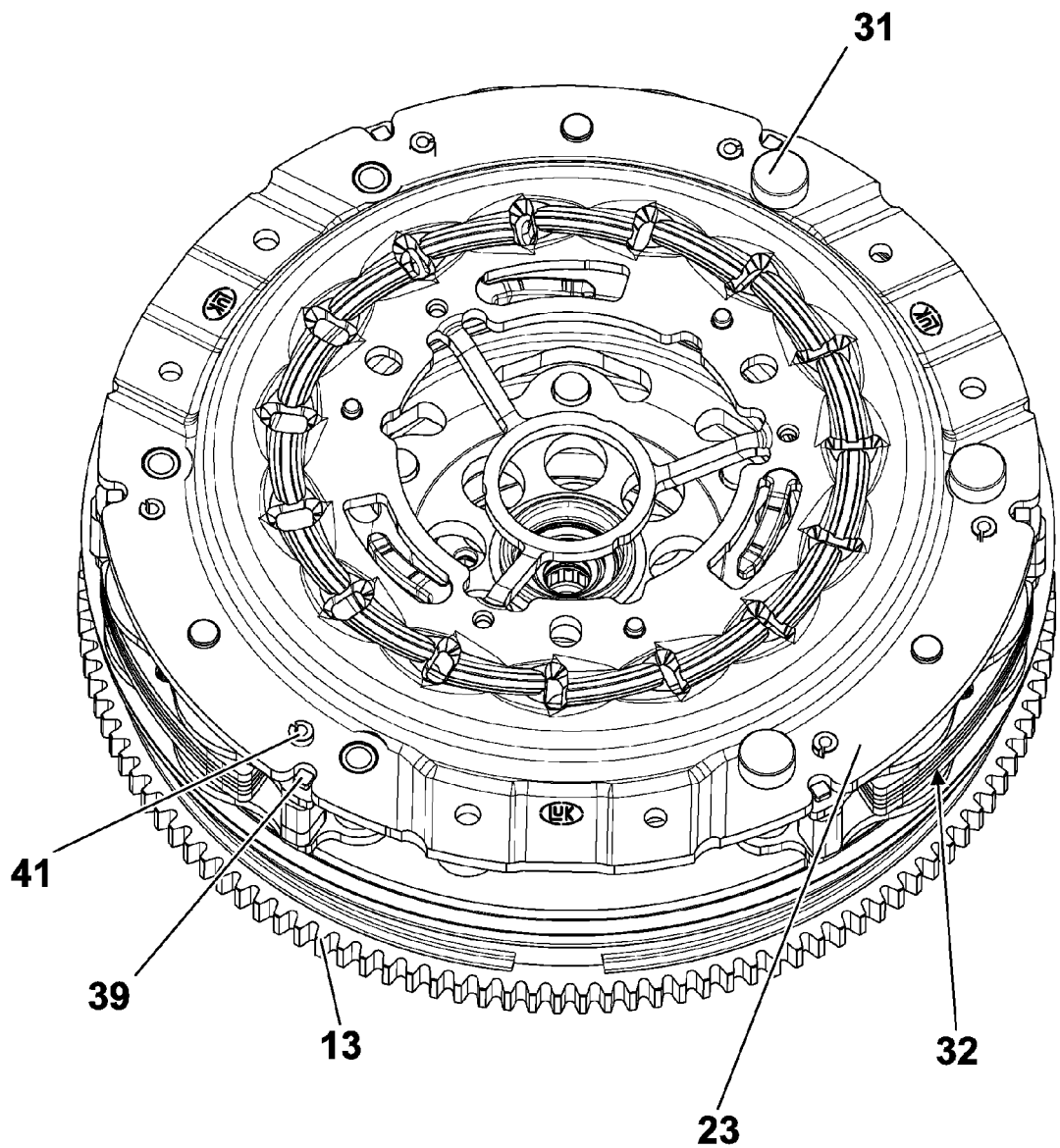
FIG. 5 shows the completely assembled clutch in a three-dimensional illustration.

The pre-assembled module which is shown in FIG. 4 and comprises the two-mass flywheel with centrifugal force pendulums 32 which are attached thereto can then be assembled with a pre-assembled clutch housing module, by the latter being pushed onto the module which is shown in FIG. 4. FIG. 5 shows the completely assembled clutch.

Figure 6:
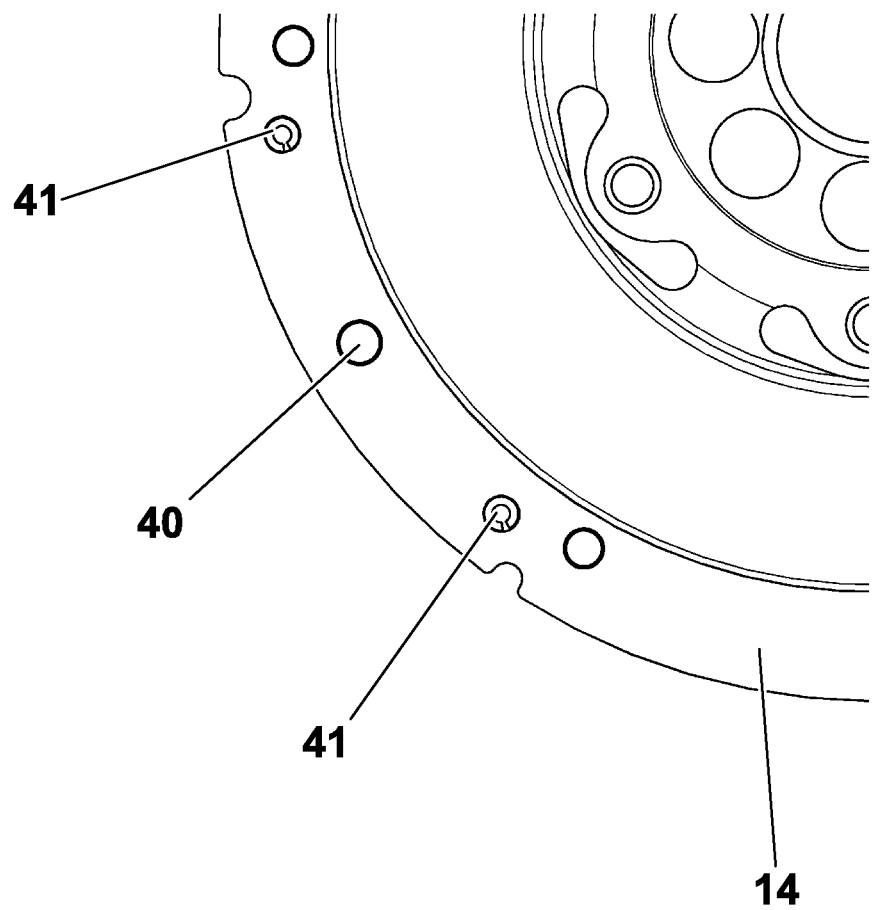
FIGS. 6 to 10 show production stages of the pre-assembly of the centrifugal force pendulum on the secondary disk.
Figure 7:
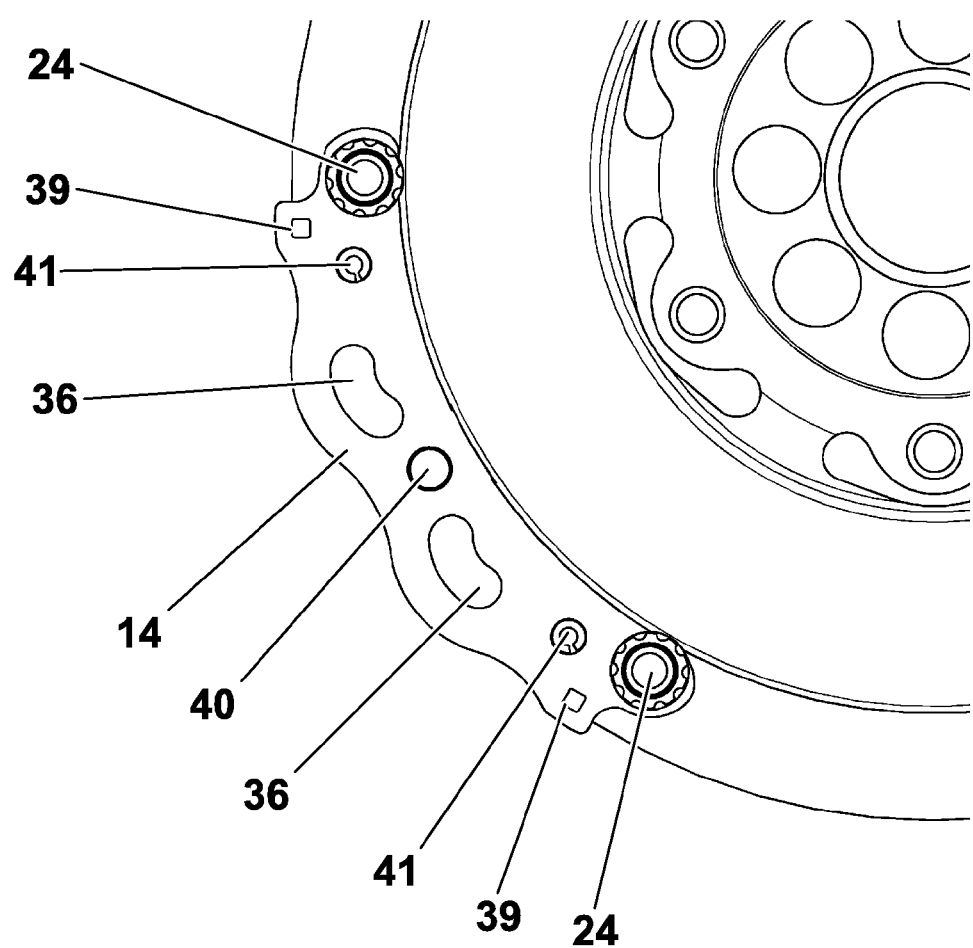
Figure 8:
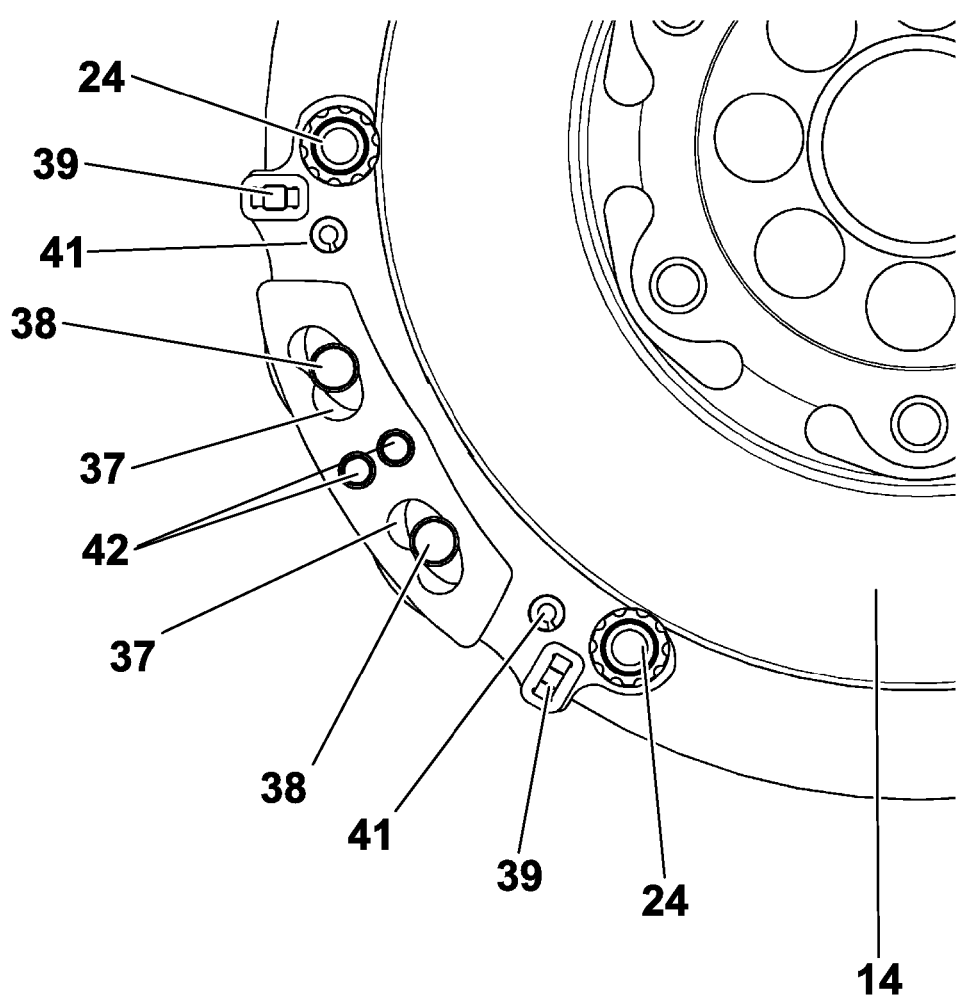
Figure 9:
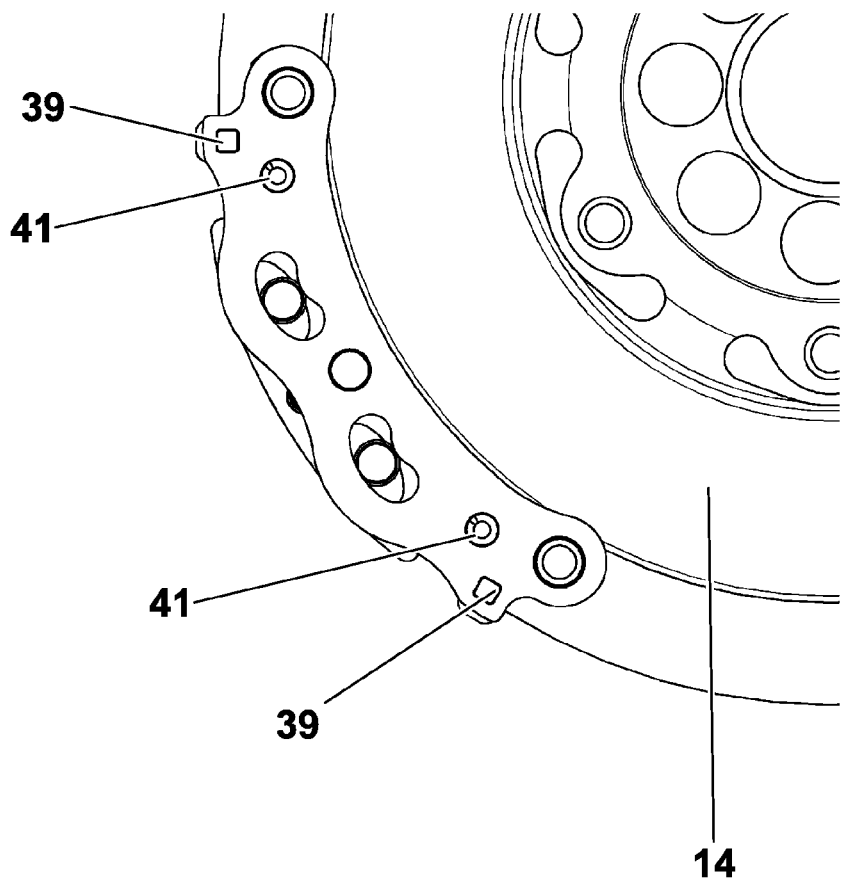
Figure 10:
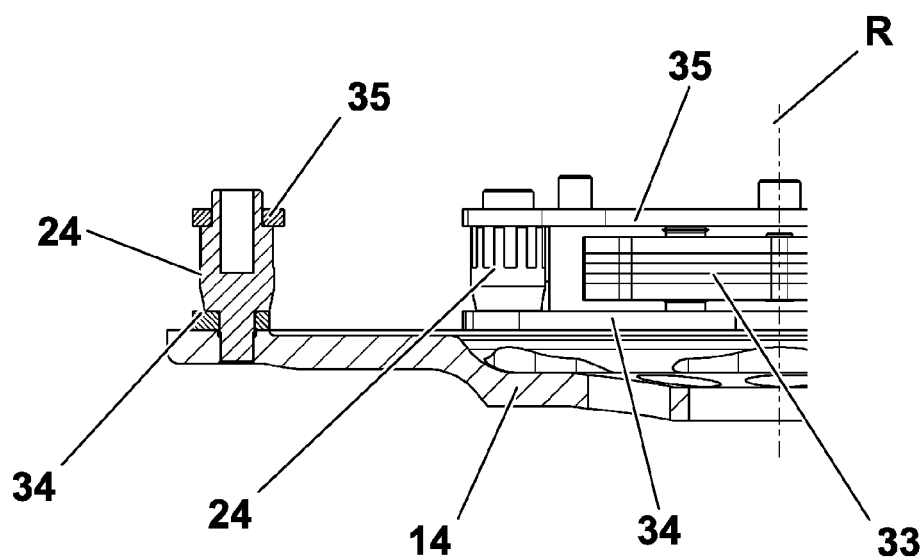

FIGS. 6 to 10 show different production stages of the pre-mounting of the centrifugal force pendulum 32 on the secondary disk 14. First of all, as shown in FIG. 6, the centering bolts 40 are pressed into the corresponding holes of the secondary disk 14. Correspondingly, the shear clamping studs 41 are also pressed into the associated holes of the secondary disk 14. In the next step, as shown in FIG. 7, the guide plates 34 on the secondary-disk side are placed or pressed onto the secondary disk 14, since they have to be pushed over the centering bolts 40 and the shear clamping studs 41. The threaded sleeves 24 are then screwed into the corresponding threaded holes of the secondary disk 14, as a result of which the guide plates 34 on the secondary-disk side are also connected fixedly to the secondary disk 14 in the axial direction. In a next step, as shown in FIG. 8, the pre-assembled pendulum masses, pre-assembled to the extent that they consist of plate stacks which are connected fixedly to one another by clamping studs 42, are inserted together with the guide pins 38 into the slotted guide recess 36 of the guide plates 34 on the secondary-disk side. Furthermore, the flat rivets 39 are inserted with the pre-assembled rubber stops. Finally, the housing-side guide plates 35 are placed on top and are riveted by way of the flat rivets 39. FIG. 10 shows the module which is pre-assembled in this way, in a side view.

LIST OF DESIGNATIONS

1 Drive train
2 Internal combustion engine
3 Crankshaft
4 Clutch arrangement
5 Transmission
6 Transmission input shaft
7 Centrifugal force pendulum
8 Flywheel
9 Primary mass
10 Connecting plate
11 Crankshaft flange
12 Fastening hole
13 Starter crown gear
14 Secondary disk
15 Secondary flange
16 Spring arrangement
17 Main damper spring
18 Auxiliary damper spring
19 Connecting flange
20 Friction clutch
21 Friction face
22 Pressure plate
23 Clutch housing
24 Threaded sleeve
25 Threaded pin
26 Bolt region
27 Region with an enlarged diameter
28 Support plate
29 Support plate
30 Hollow-cylindrical flange
31 Screw
32 Centrifugal force pendulum
33 Pendulum mass
34 Guide plate on the secondary-disk side
35 Housing-side guide plate
36 Slotted guide recess
37 Slotted guide recess
38 Guide pin
39 Flat rivet with rubber stop
40 Centering bolt
41 Shear clamping stud
42 Clamping stud

The invention claimed is:

1. A clutch arrangement, comprising a flywheel which is arranged on a drive side, coupled by a spring arrangement to a secondary disk that, with the secondary disk, forms part of a two-mass flywheel, the secondary disk carries at least one centrifugal force pendulum, a threaded sleeve is screwed via an external thread into an internal thread of the secondary disk, and a clutch housing is screwed with a fastener to an internal thread of the threaded sleeve.

2. The clutch arrangement as claimed in claim 1, wherein the at least one centrifugal force pendulum is pre-assembled as a module, and attached to the secondary disk.

3. The clutch arrangement as claimed in claim 1, wherein the at least one centrifugal force pendulum comprises a guide plate located on a secondary-disk side and a housing-side guide plate, between which a pendulum mass is arranged, the guide plates being arranged on both sides of a region of the threaded sleeve having an enlarged diameter.

4. The clutch arrangement as claimed in claim 3, wherein at least one shear clamping stud is mounted in holes of the secondary disk and of the clutch housing and protrudes through holes of the secondary-side guide plate and of the housing-side guide plate.

5. The clutch arrangement as claimed in claim 3, wherein at least one stop limits the pendulum movement of the pendulum mass.

6. The clutch arrangement as claimed in claim 5, wherein the at least one stop is mounted in holes of the secondary-side guide plate and of the housing-side guide plate.

7. The clutch arrangement as claimed in claim 5, wherein the at least one stop is a flat rivet with a stop-damping sheath.

8. The clutch arrangement as claimed in claim 7, wherein the flat rivet is riveted to the housing-side guide plate.

9. The clutch arrangement as claimed in claim 1, wherein the threaded sleeve has a hollow-cylindrical flange which protrudes into a hole of the clutch housing.

10. The clutch arrangement as claimed in claim 1, wherein a primary cover of the drive-side flywheel has a hollow-cylindrical region which covers at least parts of the centrifugal force pendulum in an axial direction to form a rupture protection arrangement.

* * * * *